US012152734B2

(12) United States Patent
Gustafson

(10) Patent No.: US 12,152,734 B2
(45) Date of Patent: Nov. 26, 2024

(54) GETTER MATERIAL, TANKS CONTAINING THE SAME, AND METHODS OF MAKING AND USING GETTER MATERIAL TO ABSORB HYDROGEN

(71) Applicant: Chart Inc., Ball Ground, GA (US)

(72) Inventor: Erik Gustafson, Woodstock, GA (US)

(73) Assignee: Chart Inc., Ball Ground, GA (US)

( * ) Notice: Subject to any disclaimer, the term of this patent is extended or adjusted under 35 U.S.C. 154(b) by 313 days.

(21) Appl. No.: 17/529,470

(22) Filed: Nov. 18, 2021

(65) Prior Publication Data

US 2022/0163168 A1    May 26, 2022

Related U.S. Application Data

(60) Provisional application No. 63/117,122, filed on Nov. 23, 2020.

(51) Int. Cl.
F17C 3/08    (2006.01)

(52) U.S. Cl.
CPC ........ *F17C 3/08* (2013.01); *F17C 2203/0395* (2013.01); *F17C 2203/0629* (2013.01); *F17C 2203/0636* (2013.01); *F17C 2223/0161* (2013.01); *F17C 2223/038* (2013.01); *F17C 2227/0381* (2013.01)

(58) Field of Classification Search
CPC ................ F17C 3/08; F17C 2203/0395; F17C 2203/0629; F17C 2203/0636; F17C 2223/0161; F17C 2223/038; F17C 2223/033; F17C 2227/0381; F17C 2221/012; B01D 2253/1122; B01D 2253/1124; B01D 2256/16; B01D 53/0423; B01D 53/02; B01J 23/6562; B01J 20/06; B01J 20/3078; B01J 20/3085; B01J 20/02; Y02E 60/32; C01B 3/001

See application file for complete search history.

(56) References Cited

U.S. PATENT DOCUMENTS

| 8,384,342 B2 | 2/2013 | Hasegawa |
| 2013/0195750 A1* | 8/2013 | Koyanaka ................. C01B 3/26 502/324 |
| 2014/0248452 A1* | 9/2014 | Toia ..................... B01J 20/0222 252/181.4 |
| 2018/0128211 A1 | 5/2018 | Perez |
| 2018/0145354 A1 | 5/2018 | Rau et al. |

FOREIGN PATENT DOCUMENTS

| CN | 105570618 A * | 5/2016 | ............. F25D 23/00 |
| DE | 102015203703 A1 * | 10/2015 | ............ F17C 13/001 |
| DE | 102017004448 A1 | 11/2018 | |

(Continued)

OTHER PUBLICATIONS

Salker et al, Activity if Pd doped and supported Mn2O3 nanomaterials for CO oxidation; Apr. 4, 2012, Springer, Reac Kinet Mech Cat (2012) 106: 395-405 (Year: 2012).*

(Continued)

*Primary Examiner* — Emmanuel E Duke
(74) *Attorney, Agent, or Firm* — Cook Alex Ltd.

(57) ABSTRACT

A low-cost getter material comprising palladium and manganese oxide and methods of making the same. A tank including said getter material, and a method of removing hydrogen gas.

3 Claims, 1 Drawing Sheet

(56) References Cited

FOREIGN PATENT DOCUMENTS

| DE | 102018216175 A1 | 3/2020 | |
|---|---|---|---|
| EP | 1526595 A2 | 4/2005 | |
| EP | 3305405 A1 | 4/2018 | |
| GB | 1339524 A | 12/1973 | |
| KR | 101887825 B1 * | 9/2018 | ............ F17C 13/001 |
| RU | 2027942 C1 | 1/1995 | |
| WO | 2010/066811 A1 | 6/2010 | |
| WO | WO-2013098734 A1 * | 7/2013 | .......... B01J 20/0207 |
| WO | WO-2013143775 A1 * | 10/2013 | ............. B60K 15/03 |

OTHER PUBLICATIONS

Belousov, et al. "The low-temperature reduction of Pd-doped transition metal oxide surfaces with hydrogen", Chemical Engineering Journal, vol. 91, No. 2-3, pp. 143-150 (2003).
Gusev, "Development and Study of Detectors for Hydrogen Detection and Registration", Annual Technical Report, No. 1, Project 1580, (2003).
Kunkalekar, et al. "Activity of Pd doped and supported $Mn_2O_3$ Nanomaterials for CO oxidation", Reac Kinet Mech Cat, vol. 106, pp. 395-405, (2012).
International Search Report and Written Opinion Dated Feb. 28, 2022 for International Application No. PCT/US2021/059850.
International Search Report and Written Opinion for PCT/US2022/052232 Dated Apr. 3, 2023.

* cited by examiner

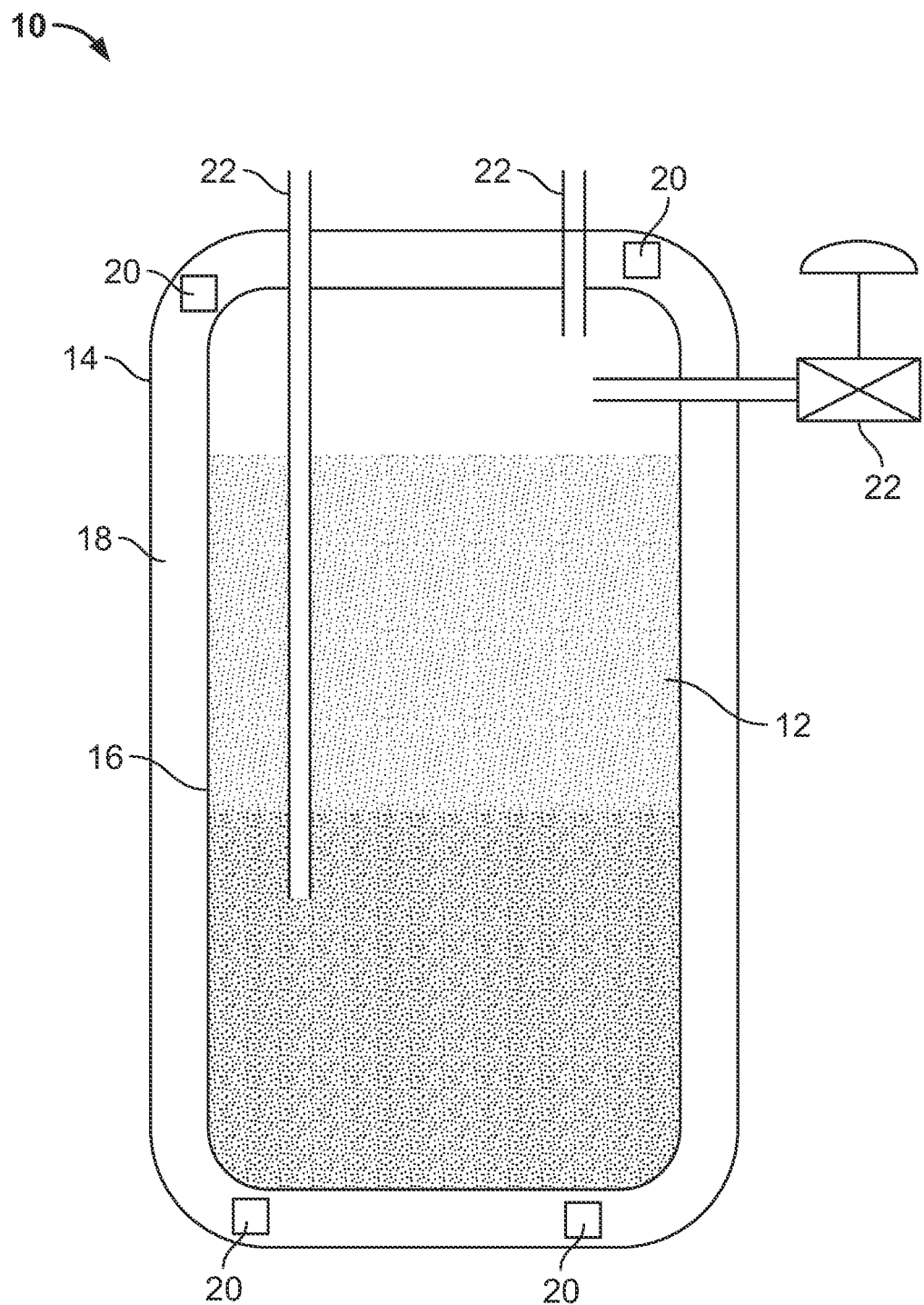

GETTER MATERIAL, TANKS CONTAINING THE SAME, AND METHODS OF MAKING AND USING GETTER MATERIAL TO ABSORB HYDROGEN

CLAIM OF PRIORITY

This application claims the benefit of U.S. Provisional Application No. 63/117,122, filed Nov. 23, 2020, the contents of which are hereby incorporated by reference.

FIELD OF THE DISCLOSURE

The present disclosure relates generally to getter material for absorbing hydrogen gases and methods of making the same. The present disclosure also is generally related to tanks including such getter material and methods of absorbing hydrogen gas in the vacuum space of a tank.

BACKGROUND OF THE INVENTION

Palladium oxide (PdO) is a commonly used getter material in the vacuum space of cryogenic tanks. Specifically, PdO is used to chemically getter hydrogen gas that outgasses from materials in the vacuum space. PdO reacts with hydrogen to form palladium metal and water. The water is gettered by other materials in the vacuum space and thus the amount of PdO decreases over time (eventually all becoming palladium metal).

One of the issues with using palladium as a getter material is that it can be very expensive. Other getter materials have been contemplated for use, but these alternative materials have their own challenges, such not being as efficient or being a potential carcinogen.

Therefore, there remains a need for new and improved getter materials.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a tank configured to contain cryogenic fluid includes an outer tank wall, an inner tank wall, and a vacuum space defined between the outer and inner walls. The tank also includes a getter material in the vacuum space, wherein the getter material includes palladium and manganese oxide, and in one embodiment palladium doped manganese oxide.

In another aspect, a getter material includes palladium and manganese oxide, and in one embodiment palladium doped manganese oxide.

In yet another aspect, a method of removing hydrogen gas from a vacuum space between walls of a tank. The method includes placing a getter material in a space between an outer wall and an inner wall of a tank, wherein the getter material included palladium and manganese oxide, and in one embodiment palladium doped manganese oxide. A vacuum is created in the space. Hydrogen gas is absorbed with the getter material.

In further aspect, a method of making a getter material. The method includes mixing a solution of palladium chloride and a solution of manganese nitrate to form a mixture. A solution of sodium bicarbonate is added to the mixture, resulting in the precipitation of manganese carbonate. Hydrogen peroxide is added to the mixture. The mixture is heated, resulting in the production of a product. The resulting product is filtered from the mixture and dried. The resulting product is heating, resulting a getter material comprising palladium and manganese oxide.

BRIEF DESCRIPTION OF THE DRAWINGS

FIG. 1 is a schematic of an embodiment of tank for containing cryogenic fluid of the disclosure;

DETAILED DESCRIPTION OF EMBODIMENTS

An embodiment of a tank 10 for containing cryogenic fluid 12 is shown in FIG. 1. The tank 10 includes an outer tank wall 14 and an inner tank wall 16. The vacuum space 18 is defined between the outer tank wall 14 and inner tank wall 16. A palladium/manganese oxide getter material 20 for absorbing hydrogen gas is located in the vacuum space 18. The tank may further include various inlets, outlets and vents designated generally as 22.

The getter material may include about 0.5 wt % to about 5 wt % palladium. Furthermore, the getter material may include between about 95 wt % to about 99.5 wt % manganese oxide. In one embodiment, the manganese oxide of the getter material includes one or more of manganese(IV) oxide, manganese(II) oxide, manganese(III) oxide, manganese(II, III) oxide and manganese(VII) oxide. In one embodiment, the getter material includes palladium doped manganese oxide.

In one method of removing hydrogen gas from a vacuum space 18 between walls 14, 16 of the tank 10. The getter material 20 is placed in a space 18 between the outer wall 14 and inner wall 16 of the tank 10. A vacuum is created in space 18. The getter material 20 including palladium and manganese oxide absorbs hydrogen gas within the space.

In one embodiment the getter material that includes palladium and manganese oxide is in an amount sufficient to absorb hydration gas for the life of the tank. For example, the amount and rate of hydration absorption of the getter material is such that the getter material will effectively absorb hydration in the vacuum space for 10 to 20 years.

The method of making the getter material may include mixing a solution of palladium chloride with a solution of manganese nitrate. Optionally, the palladium and manganese nitrate are at stoichiometric amounts. In one embodiment the amounts of palladium chloride and manganese nitrate are such that resulting getter material includes palladium of between 0.5 wt % and 5 wt %, and manganese oxide of between 95 wt % and 95.5 wt %.

Sodium bicarbonate solution is added to the mixture to cause the precipitation of manganese carbonate. In one embodiment, the amount of sodium bicarbonate is stoichiometrically equivalent to the amount of the manganese in the mixture. Hydrogen peroxide is added to the mixture, and the mixture is heated, resulting in a product. In one embodiment the hydrogen peroxide is a 30% solution. Optionally, the mixture is continuously stirred while heating. The resulting product is filtered and dried. In one embodiment, the product is dried at a temperature between 60° C. and 120° C. for between 16 hours and 24 hours. The product is then calcined between 200° C. and 300° C. for between 6 hours and 24 hours to form the getter material including palladium and manganese oxide.

EXAMPLE

While stirring, a 0.06 M solution of palladium chloride was mixed with a 2.0 M solution of manganese nitrate. 0.8 M solution of sodium bicarbonate was added to the solution to cause the precipitation of manganese carbonate. The amount of sodium bicarbonate was stoichiometrically equivalent to the amount of manganese, causing its precipitation as a carbonate. A small amount of 30% hydrogen peroxide (between 0.1 to 1 mL per gram of expected final product) was added to the solution. The mixture was then heated to 80° C. while continuing to stir for 30 minutes. The resulting product was then filtered and dry overnight (about 16 hours). Then it was calcined at 200 C for 24 hours, resulting a palladium and manganese getter material.

While the preferred embodiments of the invention have been shown and described, it will be apparent to those skilled in the art that changes and modifications may be made therein without departing from the spirit of the invention.

What is claimed is:

1. A tank configured to contain cryogenic fluid, comprising:
   a. an outer tank wall;
   b. an inner tank wall;
   C. a vacuum space defined between the outer tank wall and the inner tank wall;
   d. a getter material in the vacuum space, the getter material comprising about 0.5 wt % to about 5 wt % palladium and about 95 wt % to about 99.5 wt % manganese oxide.

2. The tank of claim 1, wherein the getter material comprises palladium doped manganese oxide.

3. The tank of claim 1, wherein the manganese oxide comprises one or more of manganese(IV) oxide, manganese (II) oxide, manganese(III) oxide, manganese(II, III) oxide and manganese(VII) oxide.

* * * * *